(12) United States Patent
Shinjo

(10) Patent No.: US 6,357,109 B1
(45) Date of Patent: Mar. 19, 2002

(54) APPARATUS FOR AUTOMATIC FIXATION OF SELF-PIERCING FASTENERS ON AN ARTICLE

(75) Inventor: Hiroshi Shinjo, Osaka (JP)

(73) Assignee: Yugenkaisha Shinjo Seisakusho, Osaka (JP)

( * ) Notice: Subject to any disclaimer, the term of this patent is extended or adjusted under 35 U.S.C. 154(b) by 0 days.

(21) Appl. No.: 09/655,878

(22) Filed: Sep. 6, 2000

(30) Foreign Application Priority Data

Sep. 6, 1999 (JP) .......................................... 11-251168

(51) Int. Cl.$^7$ ................................................ B23P 19/00
(52) U.S. Cl. ........................ 29/798; 29/818; 29/243.53; 227/114; 227/119
(58) Field of Search ................................ 29/432.1, 509, 29/522.1, 524.1, 525, 525.01, 525.05, 525.06, 525.11, 465, 464, 798, 809, 818, 243.53, 243.54; 227/149, 116, 119, 107, 114; 221/12, 171, 173, 208, 224, 225, 226, 230

(56) References Cited

U.S. PATENT DOCUMENTS

| 3,971,116 A | * | 7/1976 | Goodsmith et al. | ........... 29/798 |
| 4,430,034 A | | 2/1984 | Fujikawa | |
| 4,459,073 A | | 7/1984 | Muller | |
| 4,555,838 A | | 12/1985 | Muller | |
| 4,729,163 A | | 3/1988 | Muller | |
| RE35,619 E | * | 10/1997 | Muller | ........................ 29/798 |
| 6,018,863 A | * | 2/2000 | Altrock | ........................ 29/798 |

FOREIGN PATENT DOCUMENTS

| JP | 58135516 | 3/1982 |
| JP | 7167128 | 12/1993 |

* cited by examiner

Primary Examiner—S. Thomas Hughes
Assistant Examiner—Jermie E. Cozart
(74) Attorney, Agent, or Firm—Antonelli, Terry, Stout & Kraus, LLP

(57) ABSTRACT

An apparatus (10) has a punching station for automatic fixation of self-piercing fasteners (2) each having a stud (3), a flange-shaped head (4) and a cylindrical lug (5) at one end of the stud. With the fastener being struck to a metallic panel (1), the lug (5) pierces it and an open rim (6) of the lug is deformed by a caulking die (11) to firmly attach the fastener to the panel. The apparatus has a feeding section (28,29) for arranging the fasteners in a continuous horizontal row perpendicular to a pressing punch (12), with the lug (5) preceding the stud. A transportation mechanism (35) receiving the fasteners from the feeding section can grip, tilt and transport the fasteners successively to the punching station where each fastener (2) is precisely aligned with the pressing punch (12), so that those fasteners which have been lying on their one sides in the feeding section do reduce overall height of the apparatus, can nevertheless be surely transported to the punching station and precisely aligned with the punch.

5 Claims, 10 Drawing Sheets

APPARATUS FOR AUTOMATIC FIXATION OF SELF-PIERCING FASTENERS ON AN ARTICLE

FIELD OF THE INVENTION

The present invention relates to an apparatus that is used in the automatic fixation of self-piercing fasteners of the stud type on a relatively thin metallic panel, by forcibly driving them onto the panel.

BACKGROUND OF THE INVENTION

Every fastener of this type comprises a threaded or non-threaded stud, a flange-shaped head and a cylindrical lug continuing therefrom, with the head formed at one end of the stud. The lug pierces a metal plate or the like (see for example the Japanese Patent Publication No. 7-41357 corresponding to U.S. Pat. No. 4,729,163, or see Patent Laying-Open Gazette No. 7-167128 and Utility Model Gazette No. 58-135516).

In order to attach such stud type self-piercing fasteners to a metallic panel, a punch or plunger for driving them is used in combination with a caulking die. This die will receive each cylindrical lug driven through the panel and assists it to take an interlocking position. In detail, the annular wall of said lug will be deformed radially and outwardly within the die and along the back of the panel. Those fasteners successively advancing in between the punch and die facing one another should take precise position coaxial with them, before struck onto the panel. If such operations are to be carried out on a large scale, the feeding and subsequent positioning of fasteners have to done in an automatic manner.

The Patent Publication 7-41357 discloses a die set assembly for automatic installation of self-piercing fasteners of the stud type. This apparatus comprises a fastener feeding section such that the sequentially fed fasteners take their position perpendicular to the axis of the punching plunger, forming a horizontal row behind the plunger (see FIG. 15 in the Publication). Alternatively, that apparatus may comprise another type of the fastener feeding section such that the fasteners take their position substantially in parallel with the axis of the punching plunger, forming a vertical row (see FIG. 20 in the Publication).

The fasteners discharged horizontally from the feeding section of the former type will then transfer into and advance through a descent passage formed in that apparatus, merely due to gravitational force. Therefore, a problem has been encountered that they could not necessarily be supplied to the punching plunger section in a reliable manner, sometimes failing to become aligned with said plunger and the caulking die.

In another case of the apparatus employing the latter type feeding section, the fasteners discharged vertically and successively therefrom will then be driven sideways by a pusher into alignment with those punch and die, in a surer manner. A flexible tube for conveying a vertical row of the fasteners has a large radius of curvature and extends a considerable vertical distance. Thus, this apparatus is rendered so high as failing to suppress overall height of a pressing mold equipped with it. Depending on given 'shut height' of the pressing mold, it often has been impossible to equip it with the fastener incorporation apparatus, particularly for the fasteners with long studs.

SUMMARY OF THE INVENTION

An object of the present invention made in view of such drawbacks is therefore to provide an improved apparatus for automatic fixation of self-piercing fasteners on a metal plate. The apparatus preferably comprises a fastener feeding section for conveying the fasteners in a continuous horizontal row. It is desirable that the feeding section is not only of a reduced overall height, but also the fasteners leaving the feeding section are surely transported towards a destination within the apparatus. The fasteners have to simultaneously be caused to take there a precisely aligned position, thereby rendering the apparatus extremely compact as a whole.

To achieve this object, the apparatus provided herein is constructed, as in the prior art apparatuses, for automatic fixation self-piercing fasteners each having a threaded or non-threaded stud, a flange-shaped head formed integral with one end of the stud and a cylindrical lug protruding from and coaxial with the head. It is important herein that the apparatus comprising a fastener feeding section, and a transportation mechanism for receiving the fasteners from the feeding section and transporting them to a punching station, is constructed as follows. The punching station will comprise a pressing punch, and a caulking die facing the pressing punch such that the fasteners are fed in between the pressing punch and the caulking die supporting a metallic panel so as to take their position coaxial with the punch and the die. The fasteners will then be struck with the punch onto the panel in a manner that the cylindrical lug does pierce the panel and an end rim of the lug is deformed with the die radially and outwardly to fixedly secure the fastener on the panel. More characteristically, the apparatus is such that the feeding section for conveying the fasteners in a continuous horizontal row makes it possible for each fastener to lie substantially perpendicular to an axis of the punch, with the cylindrical lug preceding the head integral with the stud of each fastener. Further, the transportation mechanism provide herein is capable of gripping the fasteners successively leaving the feeding section, then tilting them sideways one by one to stand upright and transporting them to the punching station where each of them is precisely aligned with the pressing punch one after another.

Preferably, both the feeding section and the transportation mechanism may be mounted on a punch block to which the pressing punch is secured to be movable up and down.

Also preferably and more typically, the transportation mechanism may comprise a tilting member, a translationally movable member, a pair of grip fingers and an actuator for the tilting and movable members. The tilting member may be held rotatingly on and by a transverse shaft that is horizontally fixed in the punch block so that this member can change its upright position to its laterally-turned position, or vice versa. The movable member may be connected to the tilting member in such a fashion as to make a translational motion towards and away from the tilting member. The grip fingers that are disposed on the movable member so as to move in unison therewith are however capable of passively opened and closed. By virtue of such a structural feature, the grip fingers will open to receive and firmly hold in position one fastener that has just been delivered from the feeding section and is still lying on its side while the tilting member is kept upright. As the tilting member is driven to take the laterally-turned position, the fastener gripped with the fingers will have its axis brought into parallel with the axis of the pressing punch. Subsequently, these axes will come into alignment with each other so as to make the fastener to take an exact position relative to said punch as the movable member is driven forward away from the tilting member.

A distal end of the pressing punch may have an aperture formed therein so as to fit on the stud as well as a retainer for temporarily keeping the stud in said aperture.

The apparatus may further comprise a stopper disposed in the vicinity of a downstream end of the feeding section. The next or succeeding fastener will engage the stopper so as not to unintentionally move ahead, until the tilting member having moved and is still moving for the preceding fastener restores its upright home position. Upon restoration of the home position by the members, an unlocking pawl disposed in either the tilting member or the movable member will free the stopper, so as to reliably feed and firmly grip the succeeding fastener in the next cycle.

It may also be preferable that the actuator for the tilting and movable members does comprise a guide groove consisting of an arcuate zone and a straight zone continuing therefrom, both the zones formed in the punch block. A pin or drive shaft may be secured on the movable member and slidingly fit in the guide groove, so as to be driven by principal and reciprocating parts of the actuator. Thus, the tilting and movable members will be forced to swing in unison and around the transverse shaft so long as the pin remains in the arcuate zone. Once the pin has entered the straight zone to gradually change its position therein, the movable member will be driven away from or towards the tilting member.

THE PREFERRED EMBODIMENTS

Figure 1:
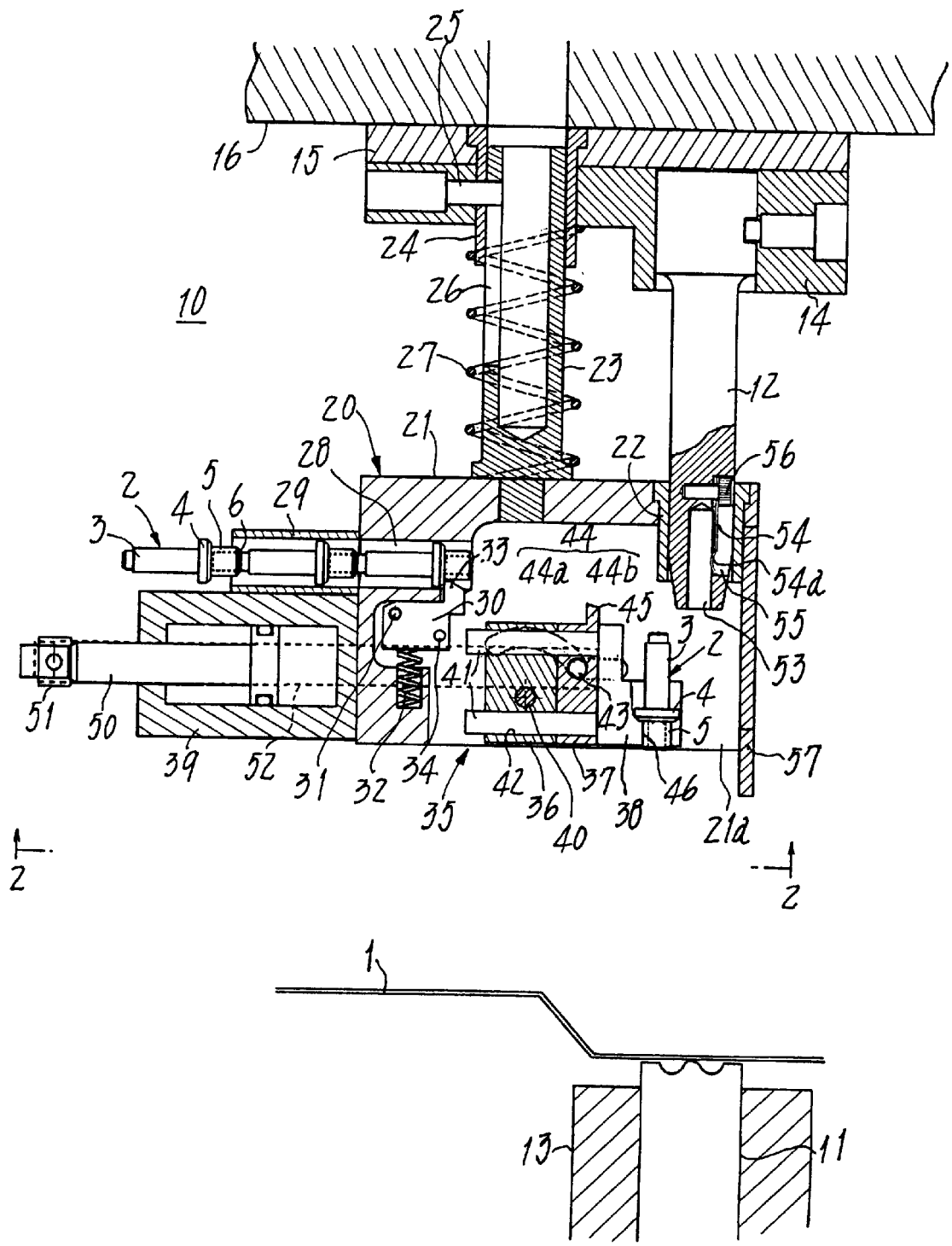
FIG. 1 is a front elevation of an apparatus used for automatic fixation of self-piercing fasteners, the apparatus being provided herein and shown partly in cross section.

Some preferable embodiments of the present invention will now be described referring to the drawings.

FIG. 1 illustrates an apparatus 10 provided herein for automatic fixation of self-piercing fasteners. This apparatus 10 is for use to fix the self-piercing fasteners 2 on a relatively thin metallic panel 1, and comprises a caulking die 11 and a pressing punch 12. The die 11 will support thereon the panel 1, whilst the punch 12 facing this die will strike each fastener 2 onto the panel so as to fixedly attach it thereto. Hereinafter, the self-piercing fasteners 2 of the stud type will be referred to simply as 'fasteners'. They are of the substantially same configuration as disclosed in the Publication or Gazettes Nos. 7-41357, 7-167128 and 58-135516. Therefore any details are not given here, except for that each fastener consists of a threaded or non-threaded stud 3, a flange-shaped head 4 formed at one end thereof and a cylindrical lug 5. This lug coaxially protruding from the head 4 will pierce the panel 1, whilst the die 11 simultaneously forces an open rim 6 of the lug 5 to expand radially and outwardly, thus unremovably securing the fastener 2 to the panel.

The caulking die 11 is held in a die holder 13, which in turn is fixed on a bolster of a pressing machine not shown, together with other lower mold parts. On the other hand, the pressing punch 12 facing and aligned with the die 11 is fixedly secured to a punch holder 14. A back plate 15 rigidly connects this holder 14 a press ram 16, together with other upper mold parts not shown. Synchronously with the press ram 16, the pressing punch 12 will move up and down to cooperate with the caulking die 11 in order that each fastener 2 having been brought into a position coaxial with the punch is attached to the panel 1.

A punch block 20 is so constructed as to facilitate feed and subsequent alignment of each fastener 2 with the pressing punch 12. The punch block 20 is of an elongated cubic form, and its box-shaped body 21 has an open bottom. A guide sleeve 22 and a guide post 23 are fixed in or on the ceiling of the box-shaped main body 21. The pressing punch 12 fitted in the guide sleeve 22 and extending in parallel with the guide post can slide up and down in and along said sleeve. The guide post 23 integrally erected on the main body's has an upper portion slidably fitted in a further guide sleeve 24, which is fixed on the punch holder 14. Thus, the punch block's main body 21 is capable of slide up and down relative to the pressing punch 12 and punch holder 14. A pin 25 attached to this punch holder is kept in engagement with a vertical groove 26, with this groove being formed in the peripheral wall of the guide post 23 and along an axis thereof. Thus, vertical stroke of the main body 21 has an upper and lower limits due to such a pin 25 engaging with the groove 26. A coiled spring 27 surrounding the guide post 23 always urges downwards the punch block main body 21.

An inlet opening 28 for the fasteners is formed in a rear region of the punch block body 21. An aperture formed through this inlet opening has one end facing the interior of the punch block in a direction generally perpendicular to the axis of pressing punch 12. A flexible tube 29 extending in the opposite direction is connected to the other end of the inlet opening 28. Compressed air from a blower not shown will propel the fasteners 2 through the tube 29 and then successively into the inlet opening 28, so that they are arranged in a horizontal row in a direction intersecting the punch's axis substantially at 90 degrees. A stopper 30 disposed inside the punch block body 21 will stop the preceding one of the fasteners 2 in the inlet opening 28. The fastener thus temporarily retained in the inlet opening is in a ready-for-use state as shown in FIG. 1. The stopper 30 is pivoted at 31 to the main body 21, and a compression spring 32 urges an interlocking pawl 33 of the stopper to engage with the flange-shaped head 4 of the fastener 2. A pin 34 protruding sideways from the stopper 30 will be acted on to unlock the pawl 33 off the fastener head.

A transportation mechanism 35 is accommodated in the hollow space of the main body 21 of punch block. This mechanism is constructed such that every fastener 2 delivered through the inlet 28 and into this space will be grasped, driven to swing and then move straight so as to finally have its axis positioned in alignment with the pressing punch 21.

The transportation mechanism 35 generally consists of a tilting member 36, a movable member 37, a pair of fingers 38 and an actuator provided in the form of a pneumatic cylinder 39 for driving the members. A transverse shaft allows the tilting member 36 to rotate about it, and the movable member connected to the tilting member is capable of moving away from and towards the former member. The fingers operatively connected to frontal end of the movable member can be opened and closed, in a manner detailed below.

Figure 2:
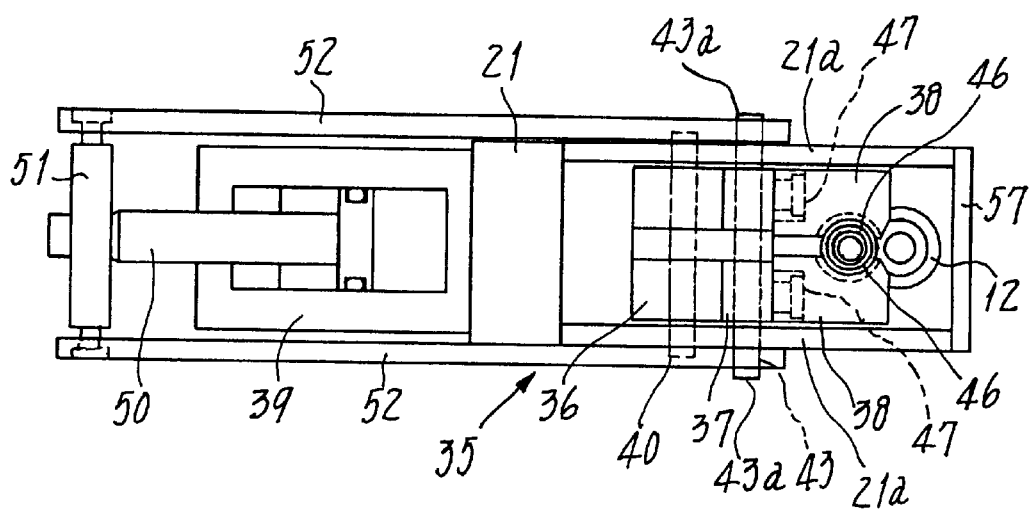
FIG. 2 is a bottom plan view of the apparatus shown along the line 2—2 in FIG. 1.

The transverse shaft 40 penetrates the tilting member 36 and have opposite ends respectively supported in side plates 21*a* of the punch block main body 21, as best seen in FIG. 2.

Figure 3:
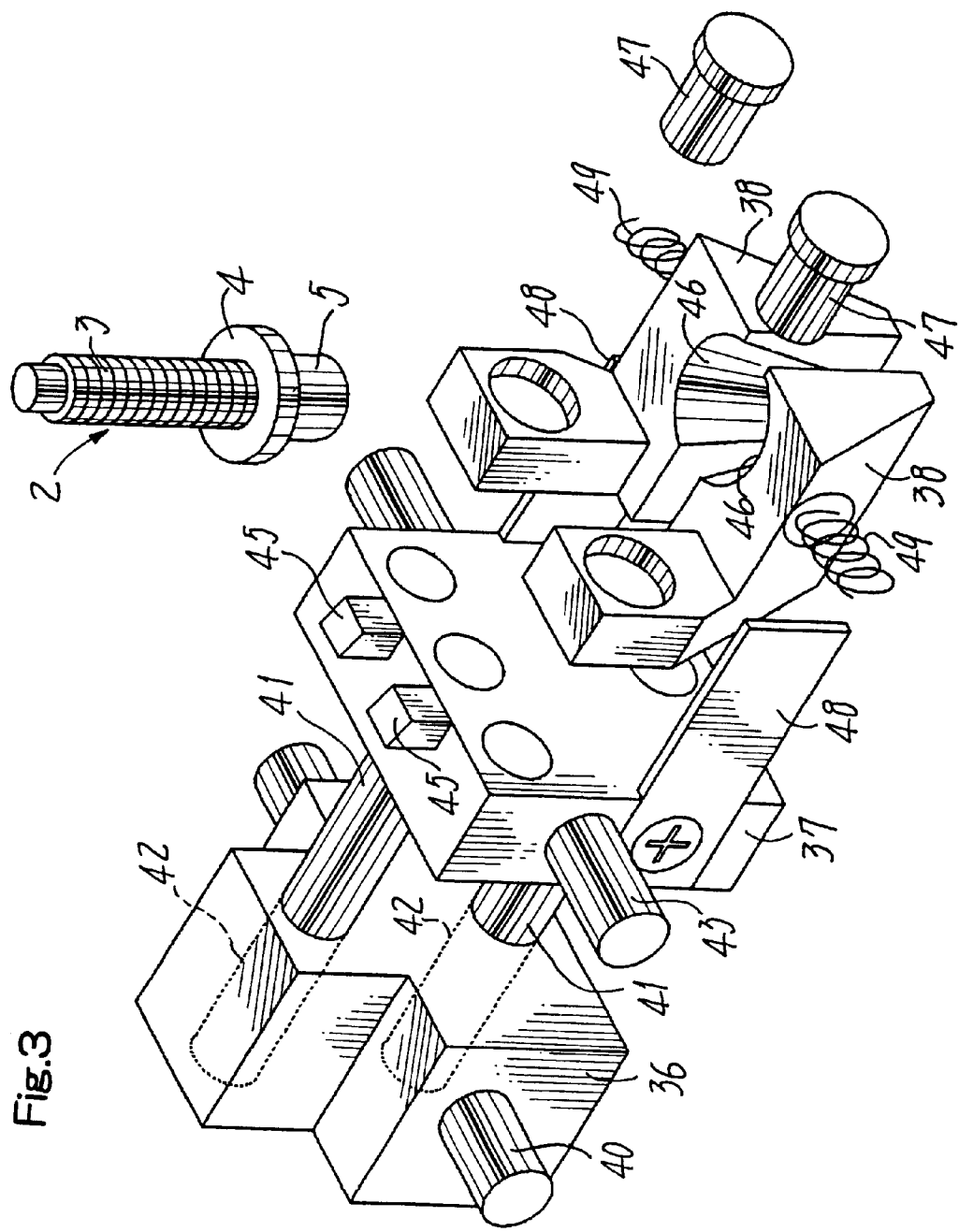
FIG. 3 is an exploded and fragmentary perspective view of a transportation mechanism included in the apparatus.

As also shown in FIG. 3, the movable member 37 has a rear side from which two parallel guide rods 41 protrude backwards. Two slots 42 formed through the tilting member 36 are in a sliding engagement with the respective guide rods 41. Accordingly, the movable member 37 can move forwards from and backwards to the tilting member 36, as mentioned above. A drive shaft 43 transversely penetrating the movable member 37 extends in parallel with the transverse shaft 40. Opposite ends of the drive shaft 43 are slidingly held in guide grooves 44 respectively formed in the side plates 21*a*. Each groove 44 consists of an arcuate zone 44*a* and a straight zone 44*b* continuing from the forward end of the former. The center of curvature of the arcuate zone 44*a* coincides with the transverse shaft 40. Each end of the drive shaft 43 engaging with and sliding along the guide groove 44 is thus shiftable between those zones. If the ends of the drives shaft 43 are in the arcuate zones 44*a*, then the movable member 37 will rotate (viz., tilt) in unison with the tilting member 36. Once the ends of the drive shaft 43 enter the straight zones 44*b*, the movable member 37 protrudes forwards and apart the tilting member 36 so as to be retracted later towards it. Ears 45 formed as unlocking pawls and protruding up from the movable member 37 are engageable with the unlocking pins 34 of the stopper 30.

The fingers 38 for gripping the fastener have at one ends thereof recesses 46 of a semicircular cross section and facing one another. The other ends of the fingers 38 are pivoted with pins 47 on the frontal face of movable member 37 so that they are swingable sideways and in opposite directions. Compression springs 49 are interposed between the fingers' side faces and respective side plates 48 fixed on the opposite sides of the movable member. Thus, the fingers 38 are always urged towards each other to take a closed position.

The pneumatic cylinder 39 is of the double-acting type having a piston rod 50, whose end is operatively connected to a transverse tie rod 51. Pivoted at opposite ends of this tie rod 51 are one ends of a pair of drive arms 52. The other ends of the drive arms are in turn pivoted to lateral protrusions 43*a* of the drive shaft 43 that supports the movable member 37 in the described manner. Due to these structural features, this drive shaft 43 is operatively connected to the pneumatic cylinder 39.

On the other hand, a vertical aperture 53 is formed in the lower end of the pressing punch 12 so as to receive the studs 3 of fasteners 2 one by one. A leaf spring 54 provided as the retainer mentioned above and serving to temporarily retain every stud in position is disposed at the punch's end. A vertical slot 55 holding the leaf spring and communicating with the vertical aperture 53 is formed in one vertical and peripheral region of said end of the pressing punch 12. A setscrew 56 secures the upper end of leaf spring 54 in such a state that the lower end thereof protrudes into the vertical aperture. This is in a fashion to elastically urge the stud to inner surface of the opposite peripheral region of said punch's end. Further, a front plate 57 depends from the forward end of the main body 21 of punch block so as to abut against while every fastener 2 is struck onto the metallic panel 1.

Operation steps of the automatic fixation apparatus of the described structure are shown in FIGS. 4 to 10 in this order.

Figure 4:
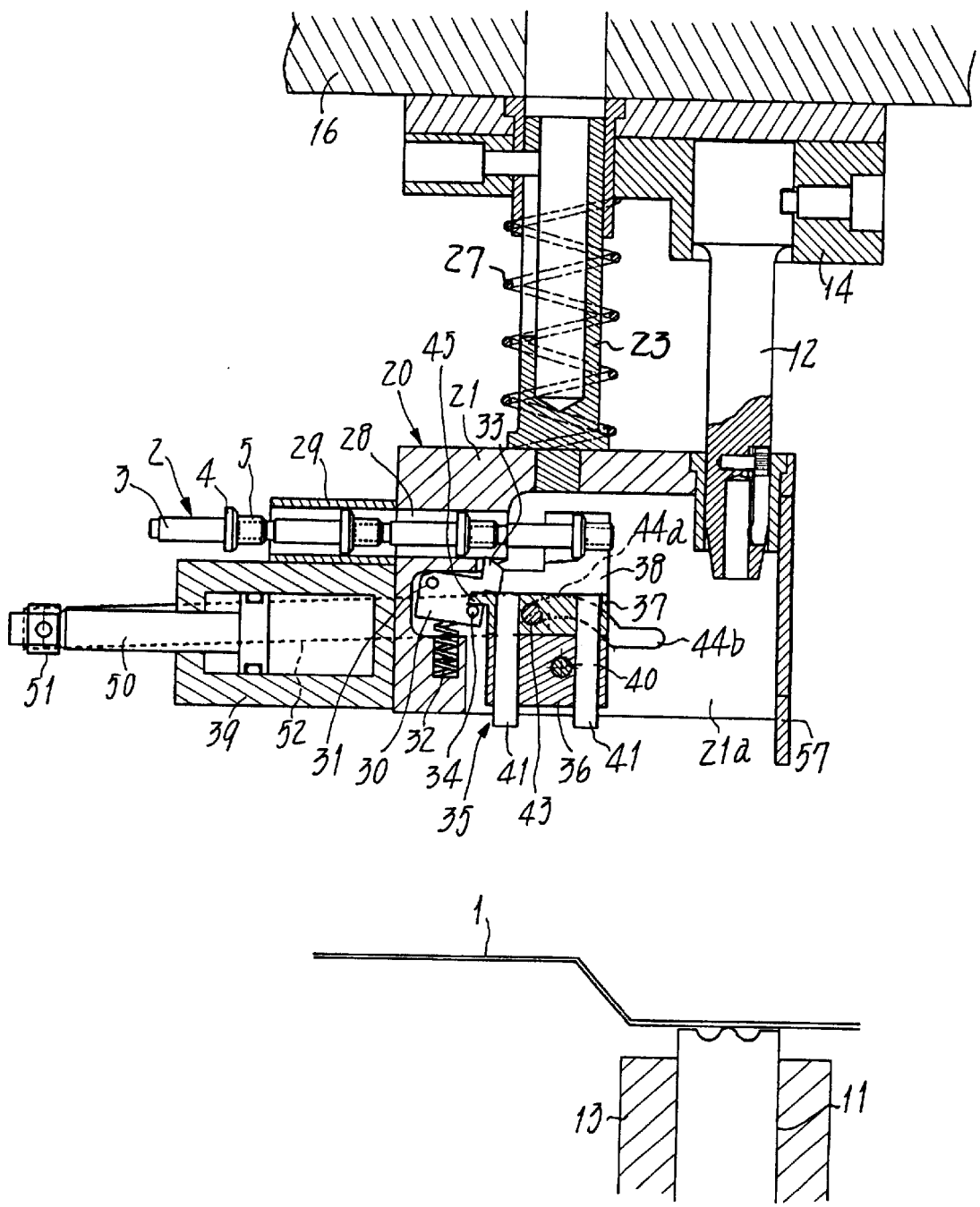
FIG. 4 is a cross-sectional front elevation of several parts ready for transportation of a fastener within the apparatus.

In FIG. 4, the tilting member 36 of mechanism 35 stands upright to be ready for transportation of the fastener 2. The ears 45 of the movable member 37 have engaged with the unlocking pins 34, so that the stopper 30 is at lowered inactive position where the locking pawls 33 are retracted to be idle. Therefore, the preceding one of the fasteners 2 that have advanced through the flexible tube 29 in a row is allowed to enter the punch block in a horizontal direction, through the inlet opening 28. The cylindrical lug 5 of the fastener will then thrust into between the grip fingers 38 and 38, spreading them against the springs 49. The flange-shaped head 4 of the fastener whose lug has thus fitted in the recesses 46 will then bear against the end faces of those fingers 38, thus holding the fastener snugly in a horizontal place. At this stage, the piston rod 50 of the pneumatic cylinder 39 is located rearmost ('most leftwards' in the drawings).

Figure 5:
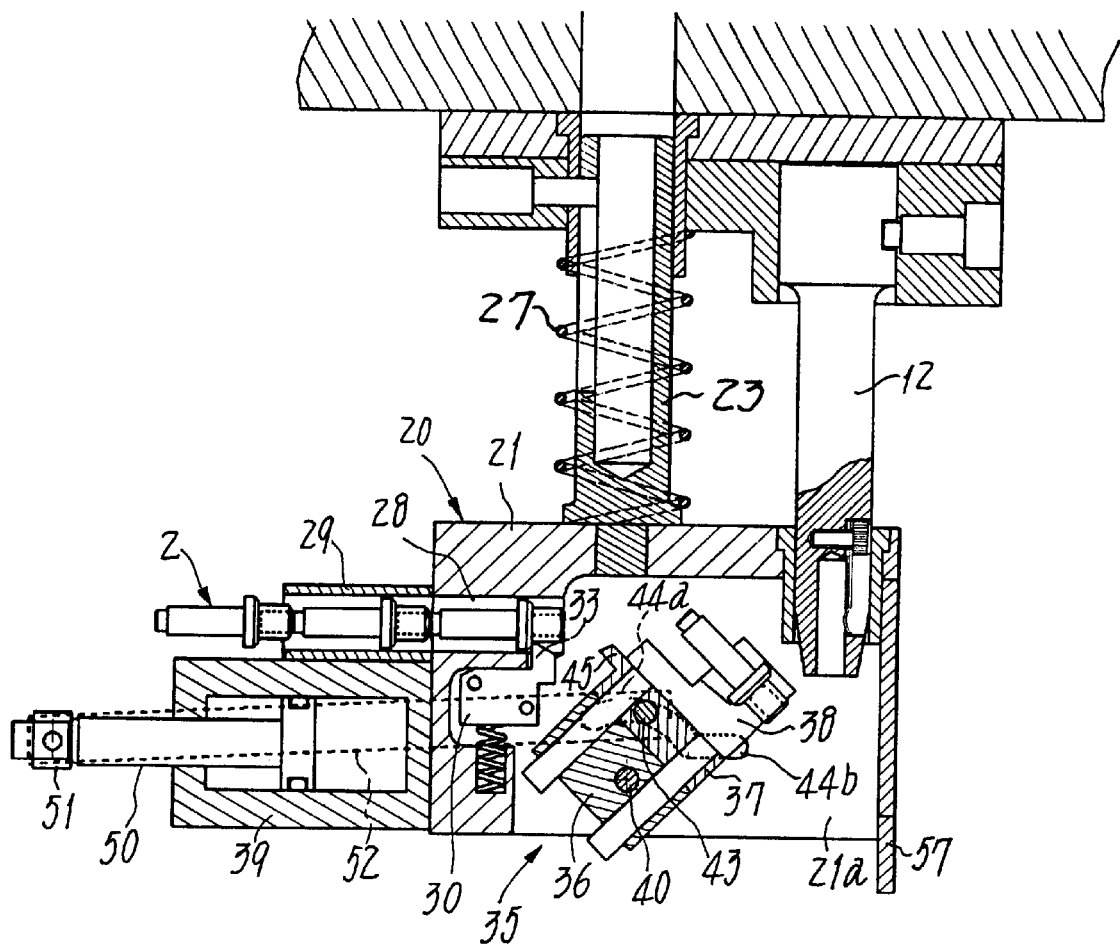
FIG. 5 is a similar front elevation of said parts that are tilting to swing the fastener from its upright position to its laid-down position.
Figure 5:
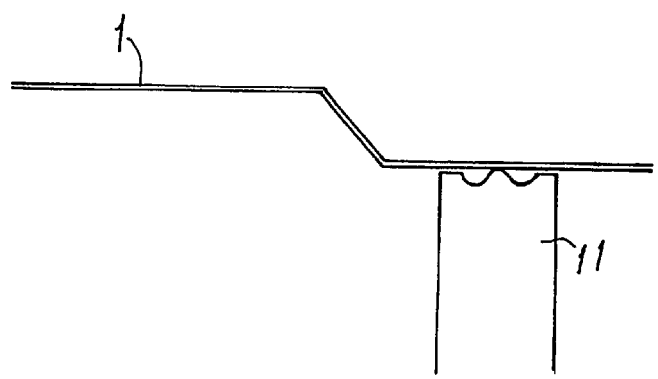

Next, the pneumatic cylinder 39 will be actuated causing its piston rod 50 to advance rightwards as shown in FIG. 5. Such a motion is transmitted through the drive arms 53 to the drive shaft 43 supporting the movable member, thereby causing the latter to move within and along the arcuate zone 44*a* of each guide groove 44. Consequently, all the tilting member 36, movable member 37 and grip fingers 38 will rotate forwards (i.e., rightwards in the drawings) in unison and about the transverse shaft 40 serving as a fulcrum. Simultaneously with this motion, the ears 45 are displaced away from the unlocking pins 34, permitting the stopper 30 to be swung up by the compression spring 32. As a result, the interlocking pawl 33 of the stopper will thus engage with the flange-shaped head 4 of the next or succeeding fastener 2 within the inlet 28. On the other hand the first or preceding fastener 2 gripped by the fingers 38 continues to gradually change its position, from horizontal posture towards vertical posture.

Figure 6:
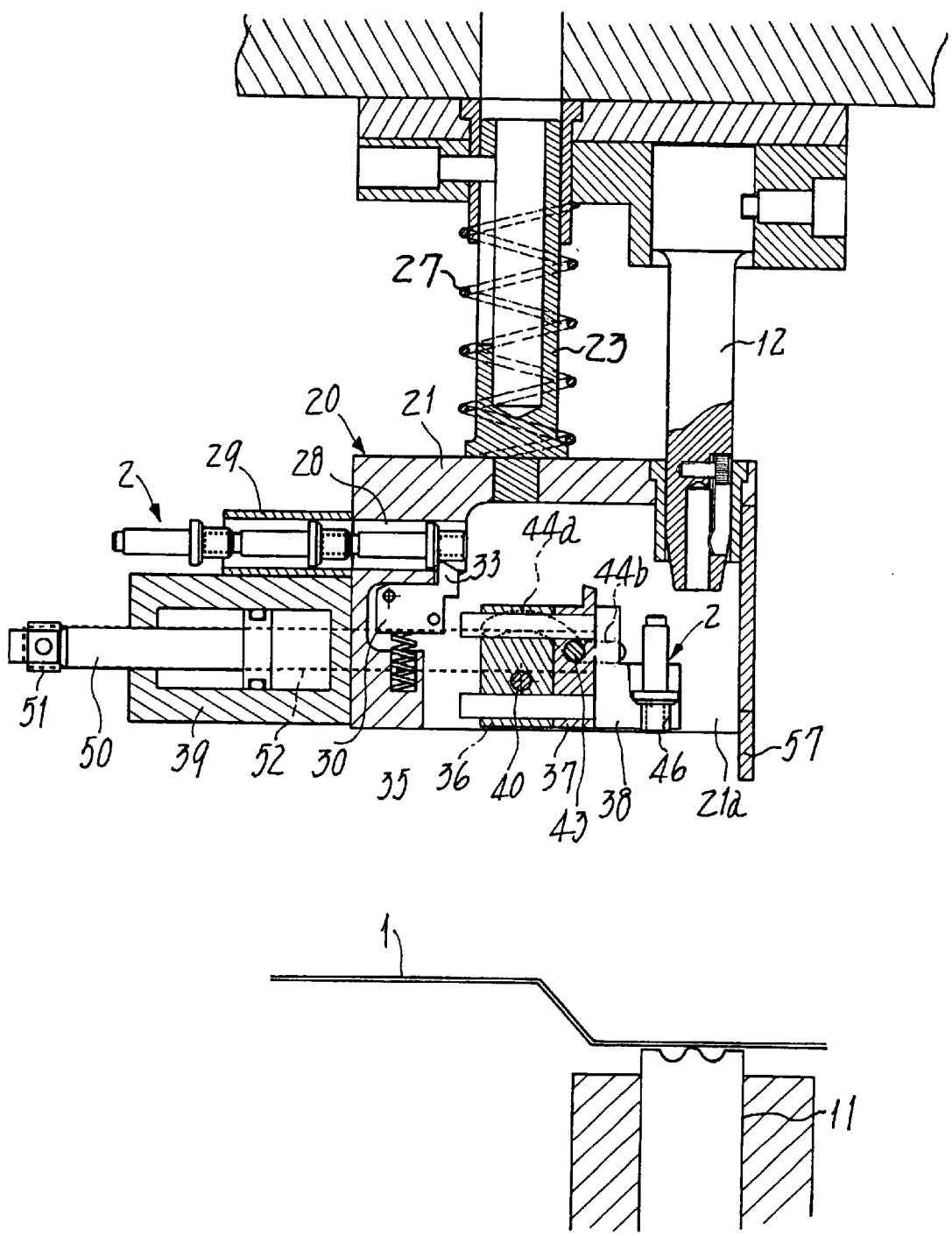
FIG. 6 also is a front elevation of said parts that have just tilted an angle of 90 degrees but have not begun translational motion.

FIG. 6 shows the drive shaft 43 that has just arrived at the forward end of the guide groove arcuate zone 44*a*. The drive shaft is now going to transfer to the straight zone 44*b*, after the tilting member 36 has just turned 90 degrees to lie on its side. In this state, the fastener 2 held in the grip fingers 38 stands upright, with its axis extending in parallel with that of the pressing punch 12.

Figure 7:
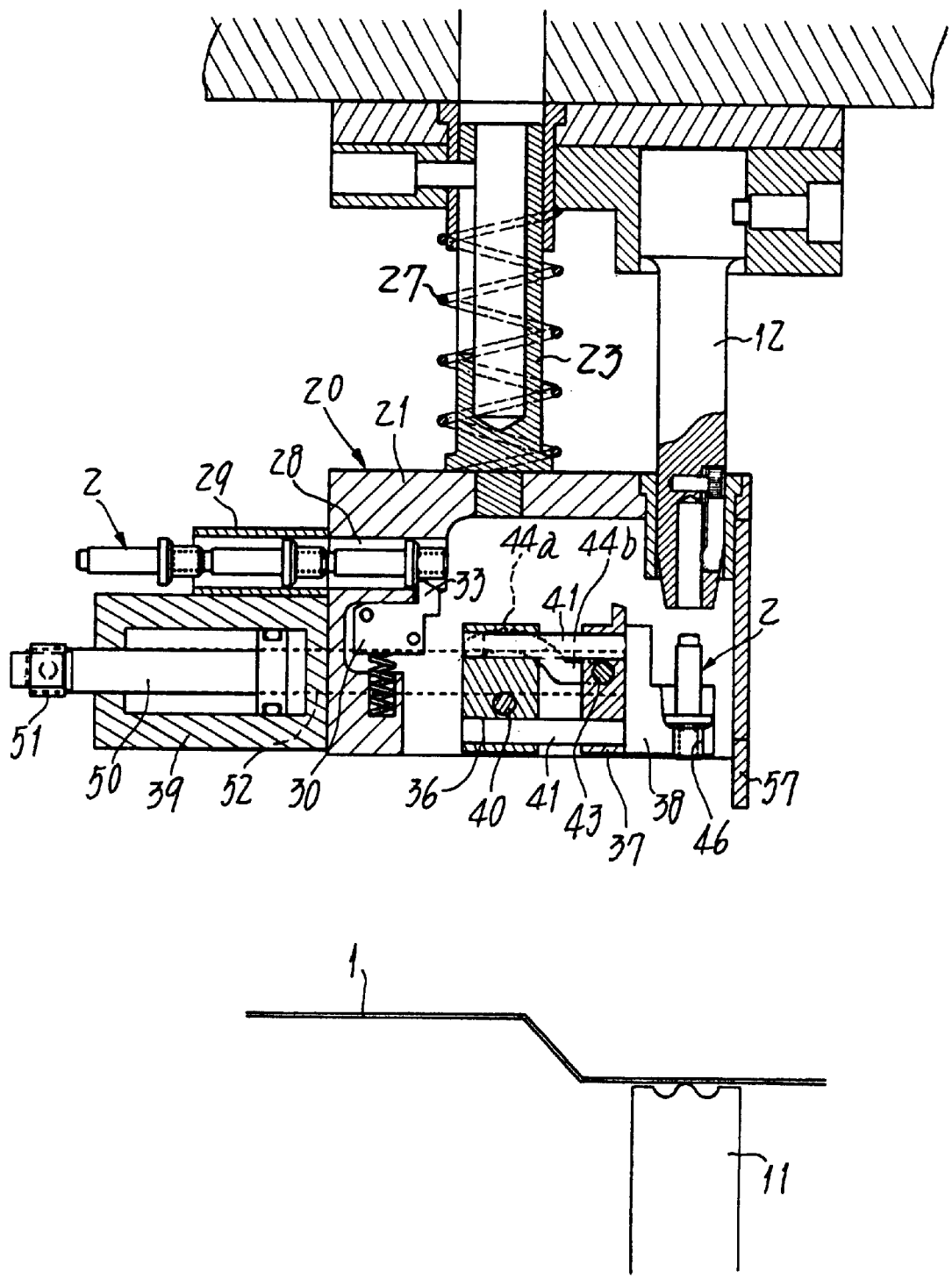
FIG. 7 is a front elevation of said parts that have just made a straight and forward stroke to displace the fastener a predetermined distance.
Figure 8:
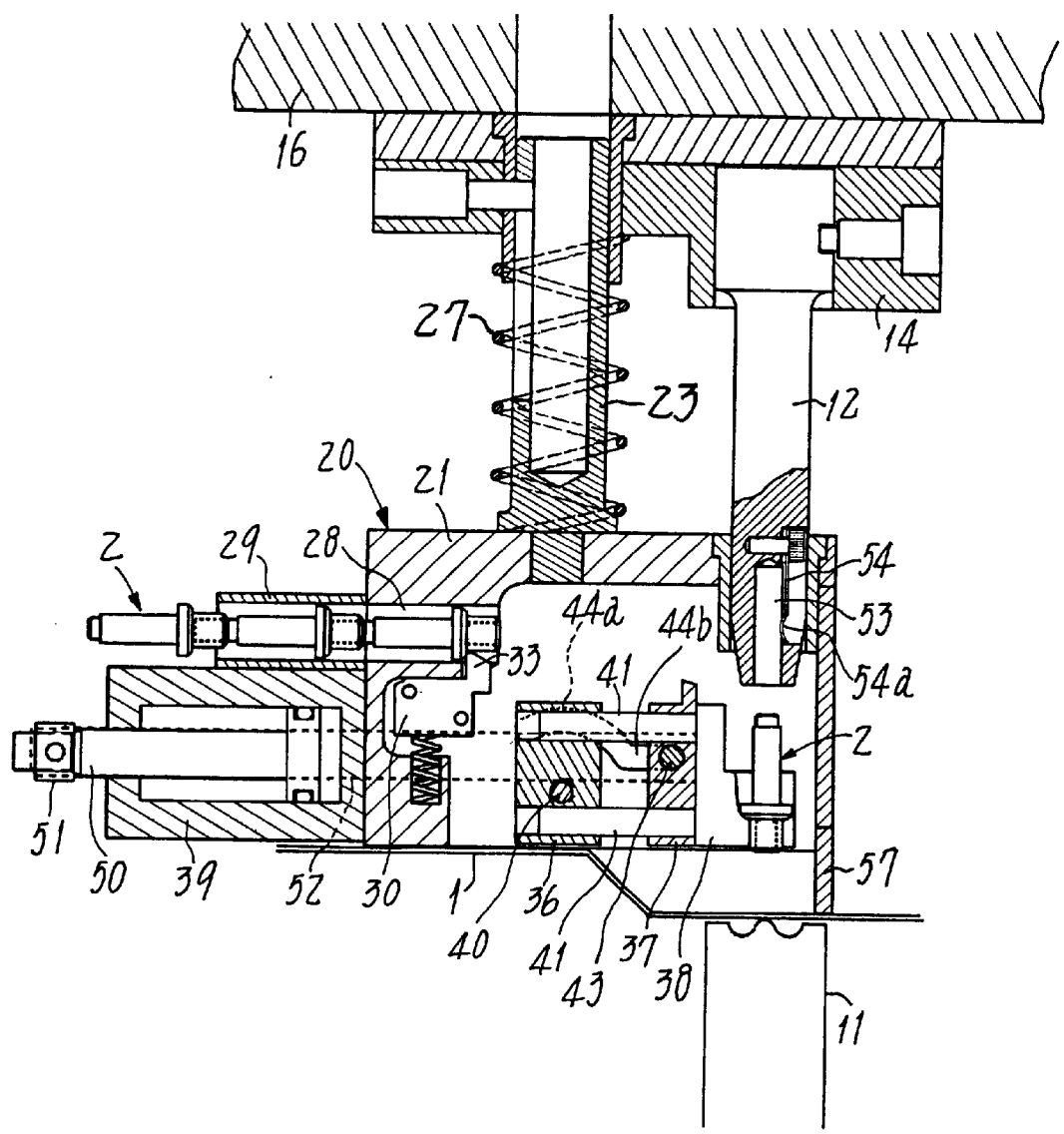
FIG. 8 is a further cross-sectional front elevation of said parts shown together with other structural members that are positioned in alignment with the fastener.
Figure 9:
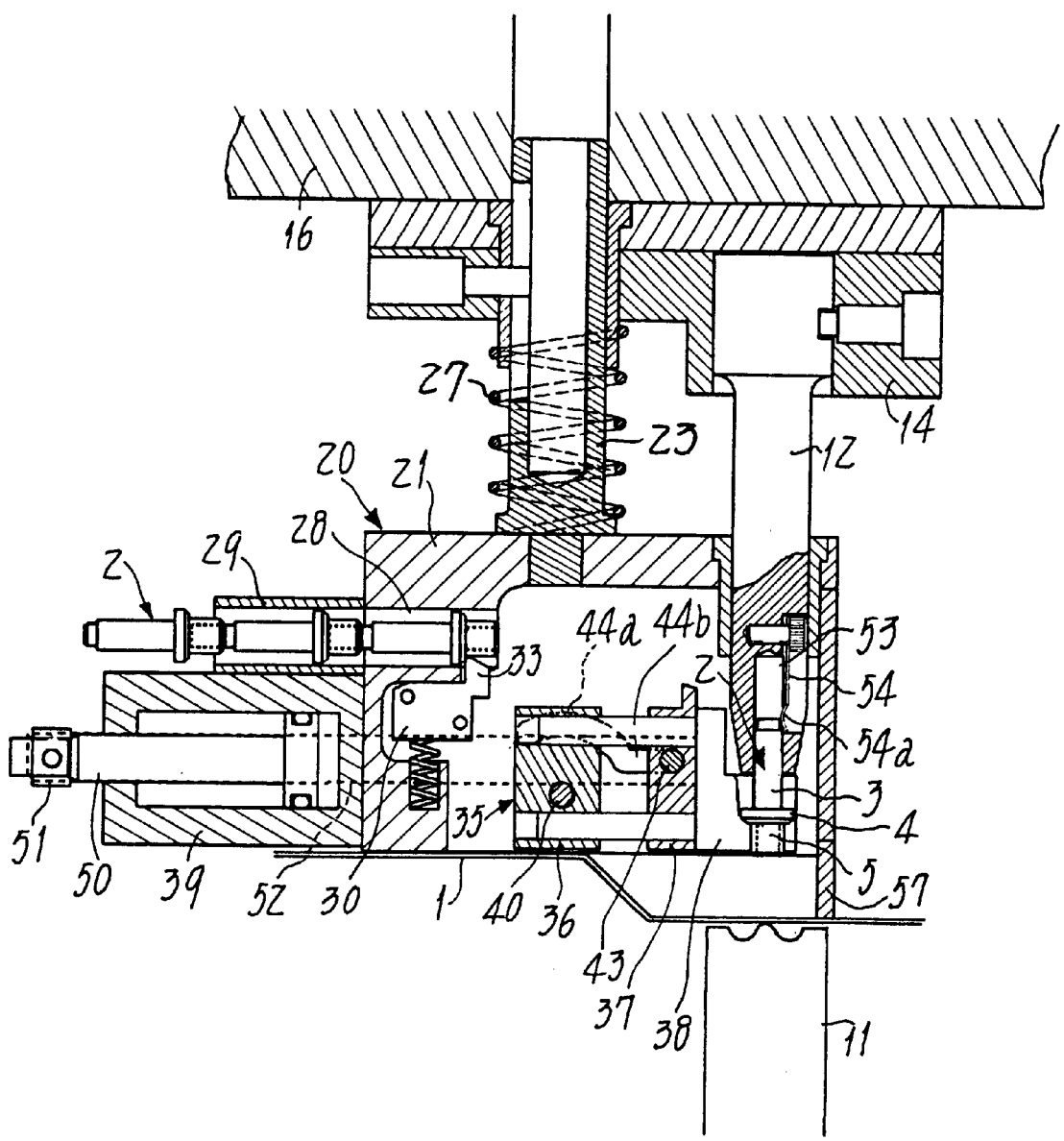
FIG. 9 is likewise a cross-sectional front elevation of said parts and said structural members, wherein the latter are now ready to strike the fastener onto a metallic panel.
Figure 10:
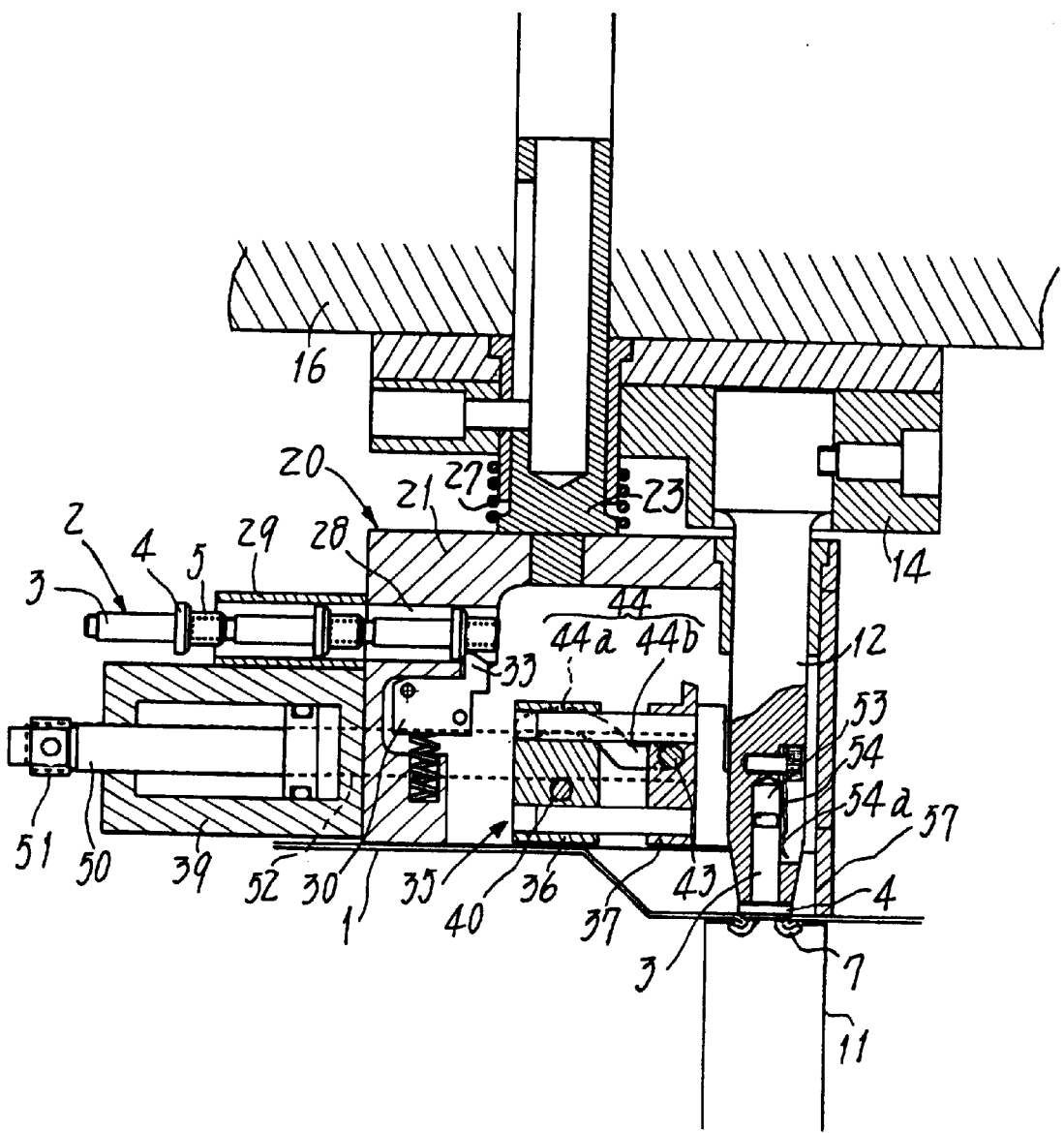
FIG. 10 also is a cross-sectional front elevation of said members that have just pressed the fastener to be fixed on said panel.

The piston rod 50 will further advance rightwards so that the drive arms 52 synchronously force the drive shaft 43 to the right in and along the straight zone 44*b* of the guide groove. Thus, the movable member 37 and the grip fingers 38 integral therewith are caused to move straight, forwards (viz., rightwards in the drawings) and separately from the tilting member. Finally, the drive shaft 43 will reach the forward end of the straight zone 44*b* as shown in FIG. 7. At this stage, the fastener 2 gripped with and having been carried by the fingers 38 is positioned coaxial with the pressing punch 12. Subsequently, the press ram 16 will be actuated to descend to lower the punch 12 and the punch block 20 in harmony and simultaneously with each other. This motion of those parts continues until the front plate 57 depending from the punch block main body 21 will collide with the metallic panel 1 as shown in FIG. 8, inhibiting the punch block 20 from descending any more. However, the press ram 16 will further be lowered, with the punch holder 14 compressing the coiled spring 27, as will be seen in FIG. 9. As the pressing punch 12 continues to descend, the stud 3 of the fastener 2 that has already been aligned with said punch enters the vertical aperture 53 thereof against restraint of the curved lower end 54a of the leaf spring 54. The punch's lower end will thus come into engagement with the flange-shaped head 4 of the fastener, and will further descend to forcibly spread the fingers 38 against the compression springs 49. This is the striking or pressing action applied to the fastener 2 as shown in FIG. 10, wherein the cylindrical lug 5 is forced to pierce the metallic panel 1. The caulking die 11 will simultaneously cause the open end rim 6 of said lug to make a radial and outward deformation, producing a hook-shaped annular end 7. This hook-shaped end 7 will cooperate with the flange-shaped head 4 to fixedly attach the fastener to the panel. Thereafter, all the parts and members discussed above are driven again but in a reversed order to return to their home position shown in FIG. 4 for the next cycle.

The present invention is not restricted to the embodiments described above but may be modified in various manners within the scope of the invention. The tilting member 36 for swinging the fastener 2 is combined in the embodiments with the movable member 37 for transporting it a straight distance. However, the former member may be employed alone if the punch block boy 21 has a space large enough to align the fastener with the pressing punch 12 only by such a swinging motion.

In summary, an apparatus provided herein for automatic fixation of stud-type self-piercing fasteners on a metal plate is such that a fastener feeding section conveying the fasteners in a continuous horizontal row reduces overall height of the apparatus. Nevertheless, the fasteners from the feeding section can now be surely transported to a punching station, each being allowed to take its position precisely aligned with a pressing punch at the station. They are gripped while they are swung, moved to and aligned at the station within a transportation mechanism employed herein, thereby rendering the apparatus extremely compact as a whole.

What is claimed is:

1. An apparatus for automatic fixation of self-piercing fasteners each having a threaded or non-threaded stud, a flange-shaped head formed integral with one end of the stud and a cylindrical lug protruding from and coaxial with the head, the apparatus comprising:

a fastener feeding section;

a transportation mechanism for receiving the fasteners from the feeding section and transporting them to a punching station;

the punching station comprising:
    a pressing punch; and
    a caulking die facing the pressing punch such that the fasteners are fed in between the pressing punch and the caulking die supporting a metallic panel so that the fasteners take a position coaxial with the punch and the die, before struck with the punch onto the panel in a manner that the cylindrical lug does pierce the panel and an end rim of the lug is deformed with the die radially and outwardly to fixedly secure the fastener on the panel, wherein the fastener feeding section for conveying the fasteners in a continuous horizontal row is constructed such that each fastener lies substantially perpendicular to an axis of the punch, with the cylindrical lug preceding the head integral with the stud of each fastener, and wherein the transportation mechanism is capable of gripping the fasteners successively leaving the feeding section, then tilting the fasteners sideways one by one to stand upright and transporting the fasteners to the punching station where each of the fasteners is precisely aligned with the pressing punch one after another.

2. An apparatus as defined in claim 1, wherein both the fastener feeding section and the transportation mechanism are mounted on a punch block to which the pressing punch is secured to be movable up and down.

3. An apparatus as defined in claim 2, wherein the transportation mechanism comprises a tilting member, a translationally movable member, a pair of grip fingers and an actuator for the tilting and movable members, the tilting member is rotatingly held on and by a transverse shaft that is horizontally fixed in the punch block so that the tilting member can change from an upright position to a laterally-turned position, or vice versa, the movable member is connected to the tilting member in such a fashion as to make a translational motion towards and away from the tilting member, the grip fingers that are disposed on the movable member so as to move in unison therewith are however capable of passively being opened and closed, whereby the grip fingers will open to receive and firmly hold in position one fastener that has just been delivered from the feeding section and is still lying on its side while the tilting member is kept upright, and with the tilting member being driven to take the laterally-turned position, the fastener gripped with the fingers will have its axis brought into parallel with the axis of the pressing punch, before these axes come into alignment with each other so as to make the fastener to take an exact position relative to said punch as the movable member is driven forward away from the tilting member.

4. An apparatus as defined in claim 3, wherein a distal end of the pressing punch has an aperture formed therein so as to fit on the stud as well as a retainer for temporarily keeping the stud in said aperture.

5. An apparatus as defined in claim 4, further comprising a stopper disposed in the vicinity of a downstream end of the feeding section so that the next or succeeding fastener will engage the stopper so as not to unintentionally move ahead, until the tilting member having moved and is still moving, for the preceding fastener will return to the upright position, wherein, upon return to the upright position, an unlocking pawl disposed in either the tilting member or the movable member will free the stopper, so as to reliably feed and firmly grip the succeeding fastener in the next cycle.

* * * * *